(12) United States Patent
Chen et al.

(10) Patent No.: US 10,317,185 B2
(45) Date of Patent: Jun. 11, 2019

(54) SILICON STEEL BAR CHECKING DEVICE

(71) Applicant: NISHOKU TECHNOLOGY INC., New Taipei (TW)

(72) Inventors: Piao-Fu Chen, New Taipei (TW); Chien-Sheng Tsai, New Taipei (TW); Wen-Hsien Chang, New Taipei (TW)

(73) Assignee: NISHOKU TECHNOLOGY INC., New Taipei (TW)

( * ) Notice: Subject to any disclaimer, the term of this patent is extended or adjusted under 35 U.S.C. 154(b) by 133 days.

(21) Appl. No.: 15/674,610

(22) Filed: Aug. 11, 2017

(65) Prior Publication Data

US 2018/0231362 A1   Aug. 16, 2018

(30) Foreign Application Priority Data

Feb. 15, 2017 (TW) .............................. 106202195 U

(51) Int. Cl.
*G01B 3/14* (2006.01)
(52) U.S. Cl.
CPC ...................... *G01B 3/14* (2013.01)
(58) Field of Classification Search
CPC ................................ G01B 5/25; G01B 11/306
USPC ........................ 33/1 BB, 533, 567, 568, 573
See application file for complete search history.

(56) References Cited

U.S. PATENT DOCUMENTS

| 7,640,670 | B2 * | 1/2010 | Zhang | G01B 3/14 33/1 BB |
| 8,020,300 | B2 * | 9/2011 | Kleber | B21J 5/00 29/894 |
| 2005/0193806 | A1 * | 9/2005 | Lysen | G01B 11/16 73/65.03 |
| 2010/0088914 | A1 * | 4/2010 | Cerwin | E01B 35/02 33/645 |
| 2015/0226536 | A1 * | 8/2015 | Huang | G01B 5/285 33/533 |
| 2019/0025038 | A1 * | 1/2019 | Izaki | G01B 5/25 |

* cited by examiner

*Primary Examiner* — George B Bennett
(74) *Attorney, Agent, or Firm* — Guice Patents PLLC

(57) ABSTRACT

A silicon steel bars checking device includes a top board, a bottom board, a block unit and multiple bolts. A room is defined between the top board, the bottom board and the block unit. The silicon steel bars are inserted into the room and positioned between the top board, the bottom board and the block unit, and checked their specification. The silicon steel bars are removed from the device without any damage.

6 Claims, 8 Drawing Sheets

SILICON STEEL BAR CHECKING DEVICE

BACKGROUND OF THE INVENTION

1. Fields of the Invention

The present invention relates to a silicon steel bar checking device, and more particularly, to a device that checks the specification of the silicon steel bars without damaging the silicon steel bars.

2. Descriptions of Related Art

The silicon steel bars are used to be installed in a plastic injection molding system to ensure that the products meet the required specifications of designers. The plastic particles are melted and blended so as to be pressurized and ejected into the molding system. The melted plastic material fills the concavities in the molding system and is then cooled to form a product that has the exactly the same space of the concavities. The silicon steel bars are made of alloy which includes only 0.5% to 4.5% of Silicon, and have high magnetic conductivity and resistance, so that the silicon steel bars are widely used to manufacture core portion of generators. However, the silicon steel bars are easily damaged when putting the silicon steel bars into the molding assembly or when removing the silicon steel bars from the molding assembly. This is partly because the users want to quickly install or remove the silicon steel bars, they use tools to hit the silicon steel bars. This hitting actions often damage the silicon steel bars. Once the silicon steel bars are damaged or even deformed, the products cannot be precisely molded by the way of plastic injection molding.

The present invention intends to provide a device that checks the specification of the silicon steel bars without hitting the silicon steel bars.

SUMMARY OF THE INVENTION

The present invention relates to a silicon steel bars checking device and comprises a top board having at least one groove defined in the underside thereof, and multiple holes are defined through the top board. A bottom board is located beneath the top board and has at least one protrusion extending from the top thereof. The at least one protrusion is located corresponding to the at least one groove. The bottom board has multiple holes which are located corresponding to the holes in the top board. A block unit is located between the top board and the bottom board, and a room is defined between the top and bottom boards and the block unit. The room has an opening in each of two ends thereof, and is adapted to accommodate silicon steel bars therein. The two ends of the top board protrude beyond the two ends of the block unit and the two ends of the bottom board, such that a space is formed between the two ends of the top board and the two ends of the block unit. Multiple bolts extend through the holes of the top board and the bottom board, and the block unit.

Preferably, the block unit includes a first block and a second block. Each of the first and second blocks has multiple threaded holes which are located corresponding to the holes of the top and bottom boards. The bolts extend through the holes of the top and bottom boards, and the threaded holes of the first and second blocks.

Preferably, the first and second blocks each have a lateral protrusion, and the two respective lateral protrusions face each other and reach into the room so as to define the room which includes a top slot, a bottom slot and a neck room which is in communication with the top and bottom slots. A lip extends from one of the first and second blocks and is located in the top slot. A semi-circular groove is defined in the other one of the first and second blocks and located in the top slot. The lip and the semi-circular groove position the silicon steel bars in the room.

Preferably, the at least one groove of the top board includes a ridge. The ridge, the lip and the semi-circular groove position the silicon steel bars in the room at three positions.

Preferably, the block unit includes a first block, a second block and a middle block which is located between the first block and the second block. The bottom board has two protrusion, and the top board has two grooves. Two rooms are defined between the top board, the bottom board, the first block, the second block and the middle block. The first and second blocks each have a lateral protrusion extending toward the middle block and located in the room corresponding thereto. The middle block has two lateral portion respectively extending from two sides thereof. The two lateral portions are located in the two rooms respectively. Each room includes a top slot, a bottom slot and a neck room which is in communication with the top and bottom slots. A lip extends from one of the first and second blocks and located in the top slot corresponding thereto. A semi-circular groove is defined in the other one of the first and second blocks and located in the top slot corresponding thereto. The middle block has a lip and a semi-circular groove respectively defined in the two sides thereof. The lips and the semi-circular grooves are adapted to position the silicon steel bars in the two rooms.

Preferably, each of the at least one groove of the top board includes a ridge. The ridge, the lip and the semi-circular groove position the silicon steel bars in each of the rooms at three positions.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
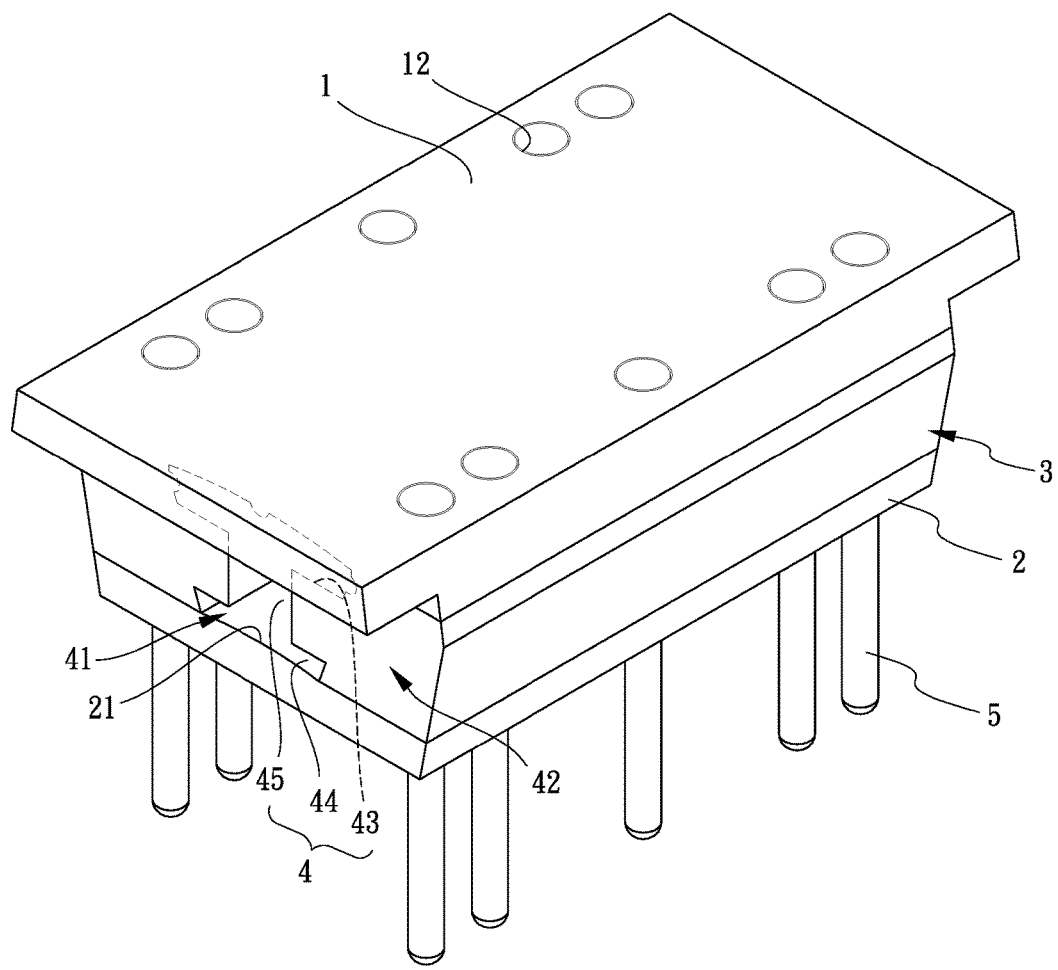
FIG. 1 is a perspective view to show the silicon steel bars checking device of the present invention
Figure 2:
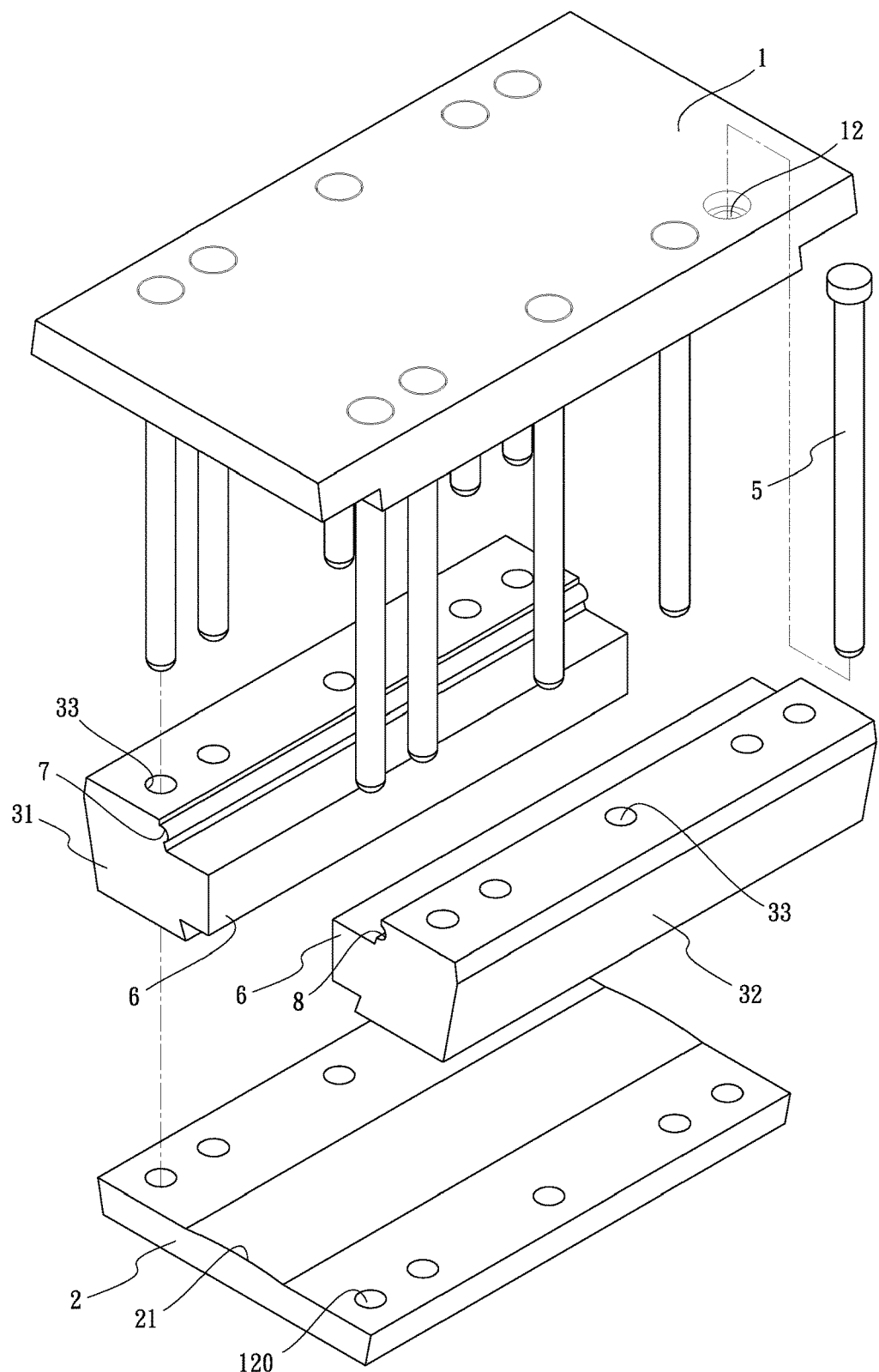
FIG. 2 is an exploded view of the silicon steel bars checking device of the present invention.
Figure 3:
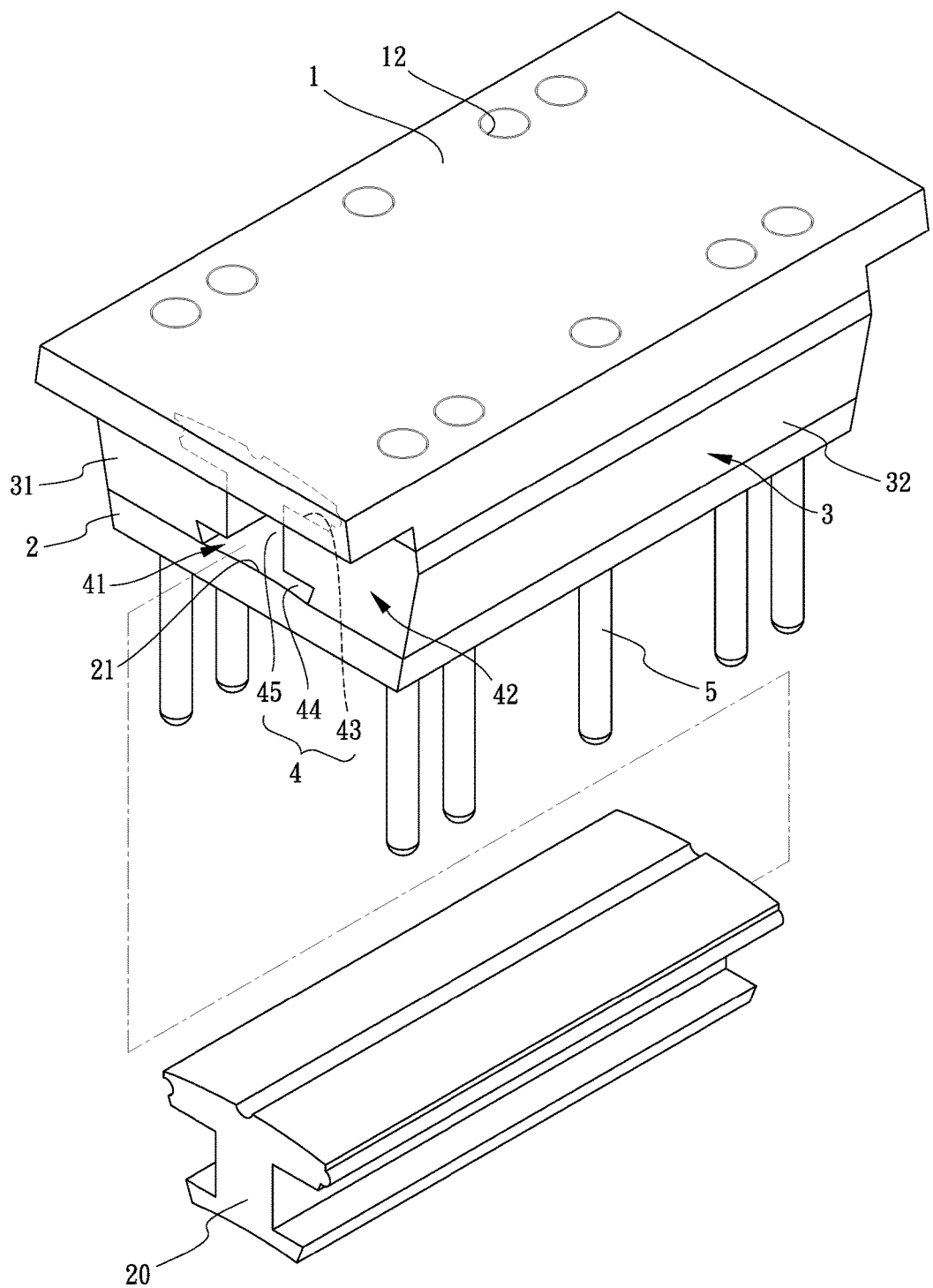
FIG. 3 shows the silicon steel bars checking device of the present invention and the silicon steel bar.
Figure 4:
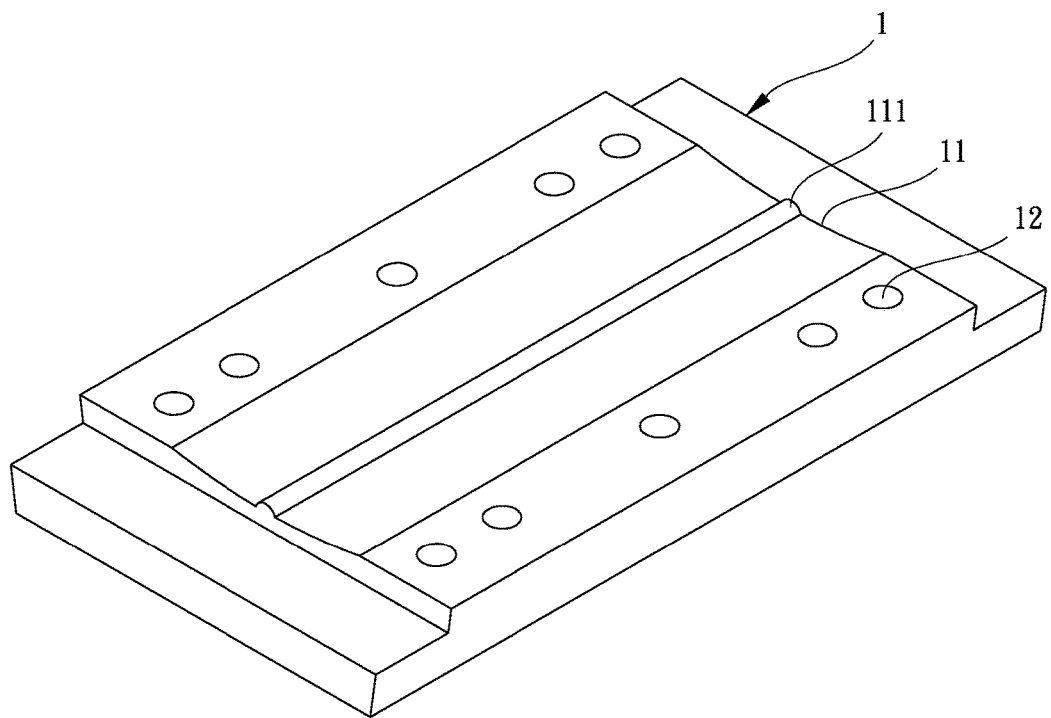
FIG. 4 is a perspective view to show the underside of top board of the silicon steel bars checking device of the present invention.
Figure 5:
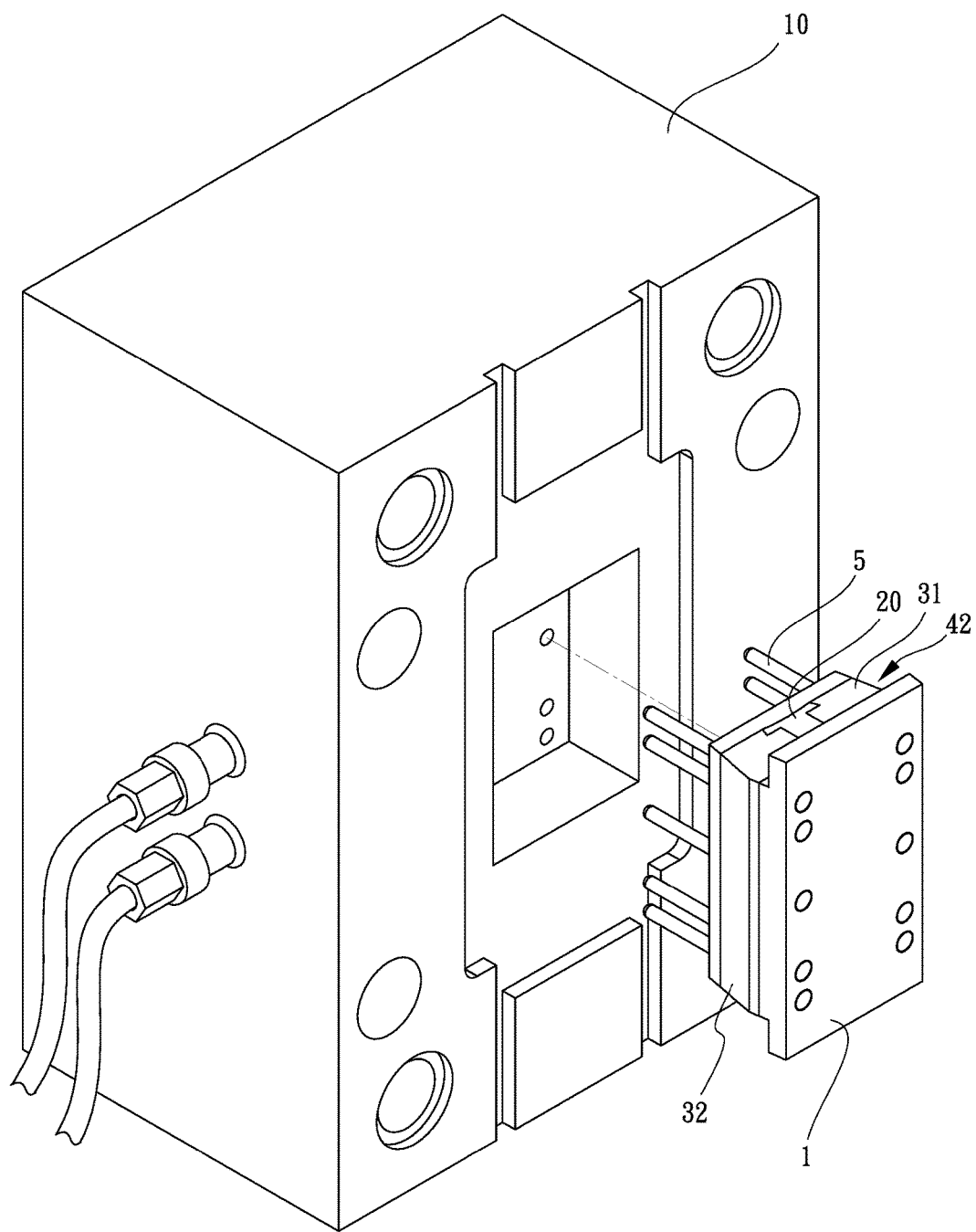
FIG. 5 shows that one silicon steel bar is positioned in the silicon steel bars checking device of the present invention, and the combination of the silicon steel bar and the silicon steel bars checking device of the present invention is to be put into the molding assembly.

Referring to FIGS. 1 to 6, the silicon steel bars checking device of the present invention comprises a top board 1 having at least one groove 11 defined in the underside thereof, and multiple holes 12 are defined through the top board 1. The at least one groove 11 is a curved groove. A bottom board 2 is located beneath the top board 1 and has at least one protrusion 21 extending from the top thereof. The at least one protrusion 21 is located corresponding to the at least one groove 11. The bottom board 2 has multiple holes 120 which are located corresponding to the holes 12 in the top board 1. A block unit 3 is located between the top board 1 and the bottom board 2, and a room 4 is defined between the top and bottom boards 1, 2 and the block unit 3. The room 4 has an opening 41 in each of two ends thereof, and is adapted to accommodate silicon steel bars 20 therein. The room 4 is an I-shaped room. The two ends of the top board 1 protrude beyond the two ends of the block unit 3 and the two ends of the bottom board 2, such that a space 42 is formed between the two ends of the top board 1 and the two ends of the block unit 3. Multiple bolts 5 extend through the holes 12, 120 of the top board 1 and the bottom board 2, and the block unit 3. The silicon steel bar 20 is positioned in the room so as to be checked its specification. The silicon steel bar 20 is able to be put into the room 4 and removed from the room 4 without damage. The silicon steel bar 20 ensures that the product to be manufactured as expected, and the product and the silicon steel bar 20 can be removed from the molding assembly 10 together.

Figure 6:
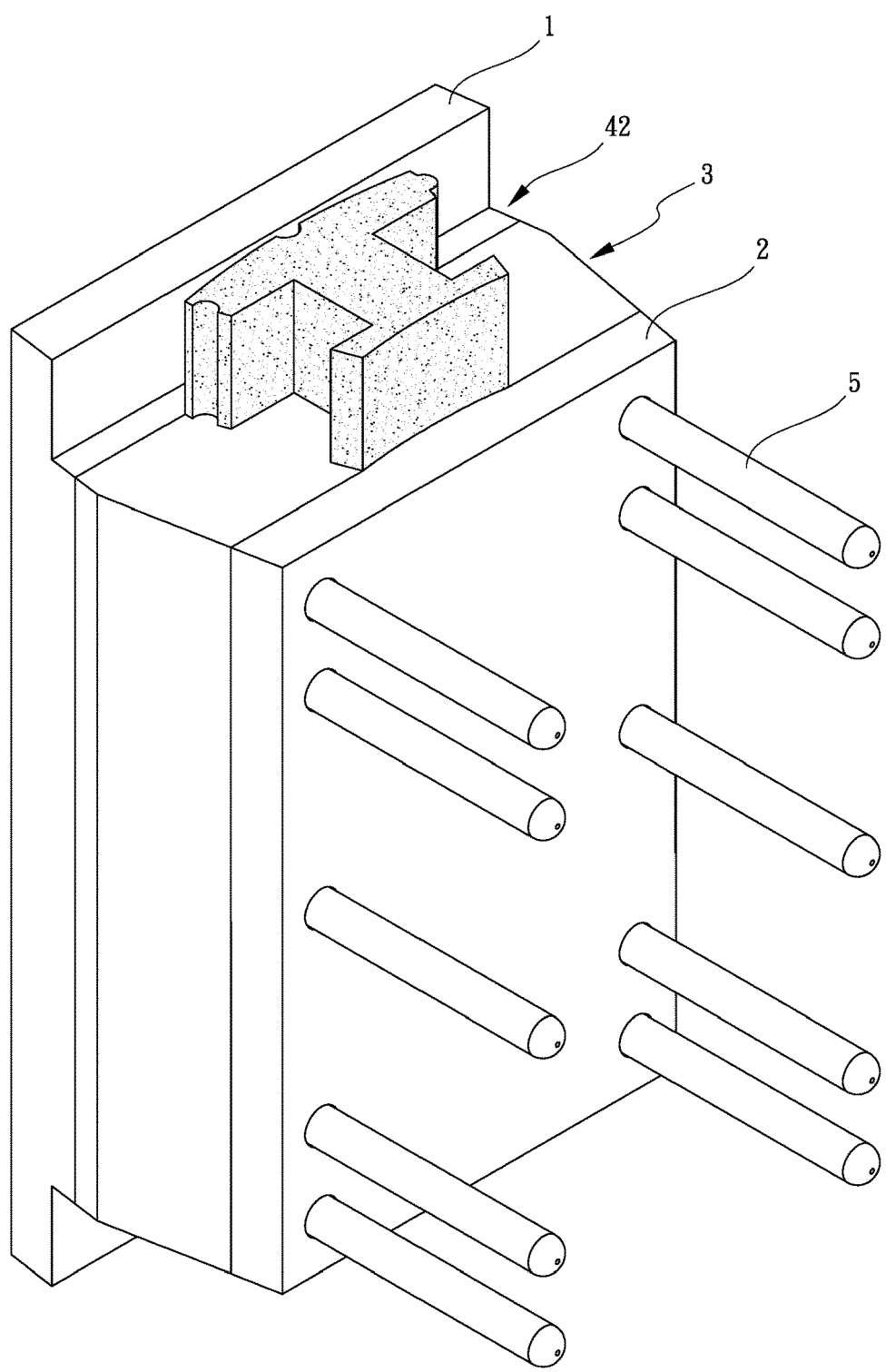
FIG. 6 shows that a product is located in the space of the silicon steel bars checking device of the present invention.

The block unit 3 includes a first block 31 and a second block 32. Each of the first and second blocks 31, 32 has multiple threaded holes 33 which are located corresponding to the holes 12, 120 of the top and bottom boards 1, 2. The bolts 5 extend through the holes 12, 120 of the top and bottom boards 1, 2, and the threaded holes 33 of the first and second blocks 31, 32. The first and second blocks 31, 32 each have a lateral protrusion 6, and the two respective lateral protrusions 6 face each other and reach into the room 4 so as to define the room 4 which includes a top slot 43, a bottom slot 44 and a neck room 45 which is in communication with the top and bottom slots 43, 44. A lip 7 extends from one of the first and second blocks 31, 32 and is located in the top slot 43. A semi-circular groove 8 is defined in the other one of the first and second blocks 31, 32 and located in the top slot 43. The lip 7 and the semi-circular groove 8 position the silicon steel bars 20 in the room 4. The at least one groove 11 of the top board 1 includes a ridge 111. The ridge 111, the lip 7 and the semi-circular groove 8 position the silicon steel bars 20 in the room 4 at three positions. The silicon steel bar 20 is positioned at three different positions so that it does not shake in the molding assembly. The product is shown in FIG. 6 and located in the space 42 beneath the top board 1.

Figure 7:
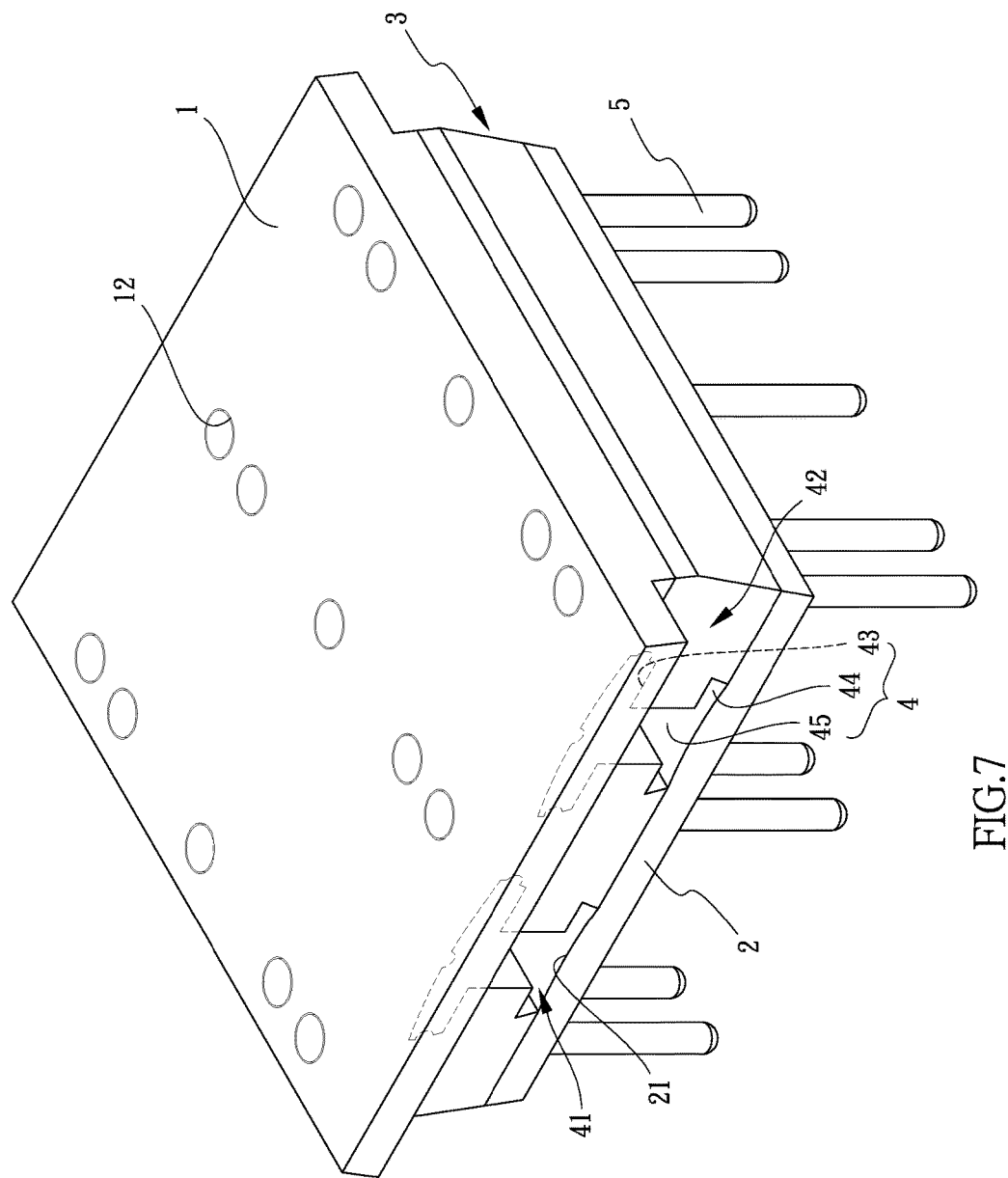
FIG. 7 is a perspective view to show the second embodiment of the silicon steel bars checking device of the present invention that includes two rooms.
Figure 8:
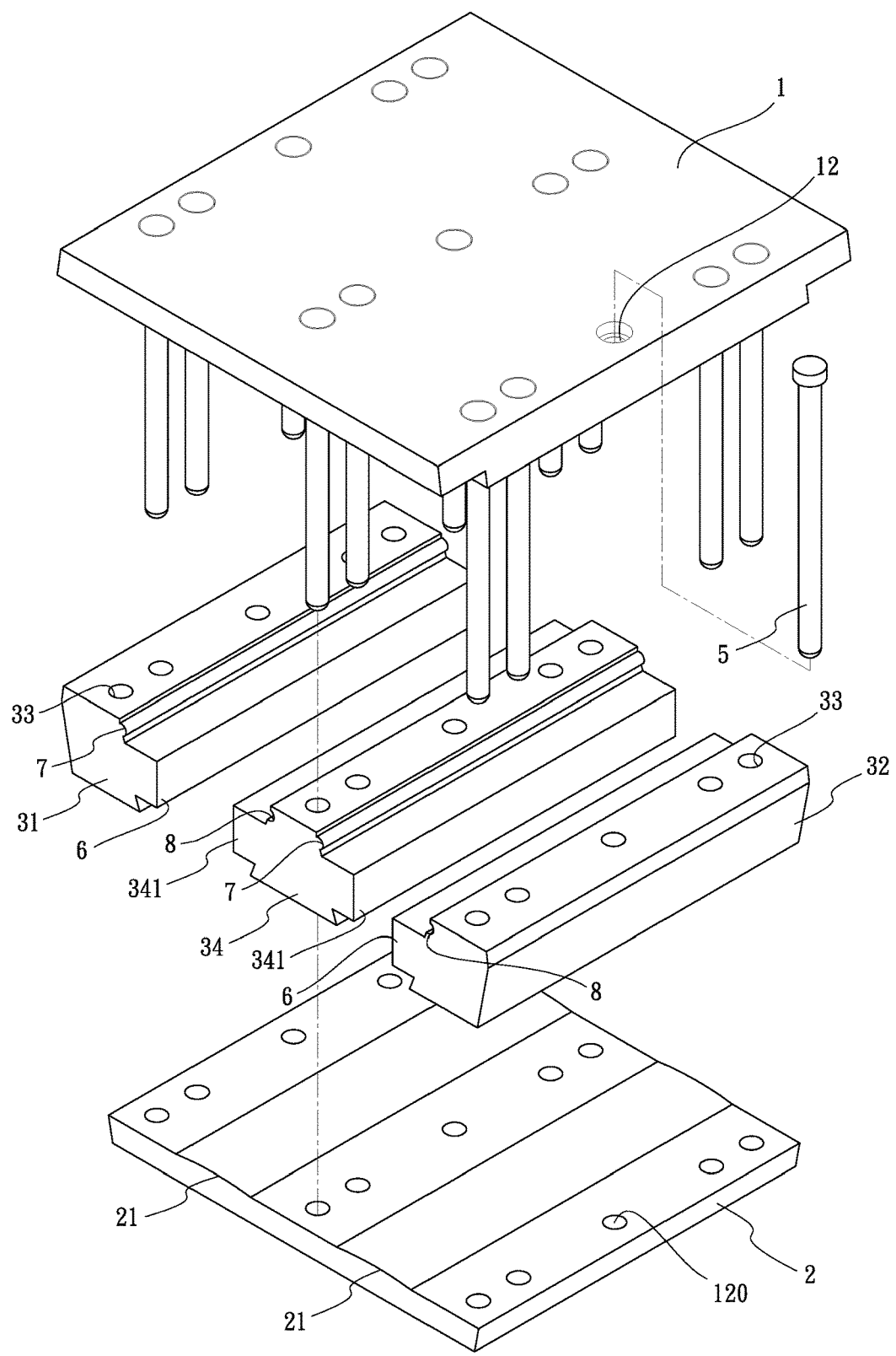
FIG. 8 is an exploded view of the second embodiment of the silicon steel bars checking device of the present invention.

FIGS. 7 and 8 show the second embodiment of the present invention which includes two rooms 4, wherein, the block unit 3 includes a first block 31, a second block 32 and a middle block 34 which is located between the first block 31 and the second block 32. The bottom board 2 has two protrusion 21, and the top board 1 has two grooves 11. Two rooms 4 are defined between the top board 1, the bottom board 2, the first block 31, the second block 32 and the middle block 34. The first and second blocks 31, 32 each have a lateral protrusion 6 extending toward the middle block 34 and located in the room 4 corresponding thereto. The middle block 34 has two lateral portion 341 respectively extending from two sides thereof. The two lateral portions 341 are located in the two rooms 4 respectively. In other words, the middle block 34 is located between the two rooms 4. Each room 4 includes a top slot 43, a bottom slot 44 and a neck room 45 which is in communication with the top and bottom slots 43, 44. A lip 7 extends from one of the first and second blocks 31, 32 and located in the top slot 43 corresponding thereto. A semi-circular groove 8 is defined in the other one of the first and second blocks 31, 32 and located in the top slot 43 corresponding thereto. The middle block 34 has a lip 7 and a semi-circular groove 8 respectively defined in the two sides thereof. The lips 7 and the semi-circular grooves 8 are adapted to position the silicon steel bars 20 in the two rooms 4. Each of the at least one groove 11 of the top board 1 includes a ridge 111. The ridge 111, the lip 7 and the semi-circular groove 8 position the silicon steel bars 20 in each of the rooms 4 at three positions.

While we have shown and described the embodiment in accordance with the present invention, it should be clear to those skilled in the art that further embodiments may be made without departing from the scope of the present invention.

What is claimed is:
1. A silicon steel bars checking device comprising:
a top board having at least one groove defined in an underside thereof, multiple holes defined through the top board;
a bottom board located beneath the top board and having at least one protrusion extending from a top thereof, the at least one protrusion located corresponding to the at least one groove, the bottom board having multiple holes which are located corresponding to the holes in the top board;
a block unit located between the top board and the bottom board, a room defined between the top and bottom boards and the block unit, the room having an opening in each of two ends thereof, and adapted to accommodate silicon steel bars therein, two ends of the top board protruding beyond two ends of the block unit and two ends of the bottom board, a space being formed between the two ends of the top board and the two ends of the block unit, and
multiple bolts extending through the holes of the top board and the bottom board, and the block unit.
2. The silicon steel bars checking device as claimed in claim 1, wherein the block unit includes a first block and a second block, each of the first and second blocks has multiple threaded holes which are located corresponding to the holes of the top and bottom boards, the bolts extend through the holes of the top and bottom boards, and the threaded holes of the first and second blocks.
3. The silicon steel bars checking device as claimed in claim 2, wherein the first and second blocks each have a lateral protrusion, the two respective lateral protrusions face each other and reach into the room so as to define the room which includes a top slot, a bottom slot and a neck room which is in communication with the top and bottom slots, a lip extends from one of the first and second blocks and located in the top slot, a semi-circular groove is defined in the other one of the first and second blocks and located in the top slot, the lip and the semi-circular groove are adapted to position the silicon steel bars in the room.

4. The silicon steel bars checking device as claimed in claim 3, wherein the at least one groove of the top board includes a ridge, the ridge, the lip and the semi-circular groove position the silicon steel bars in the room at three positions.

5. The silicon steel bars checking device as claimed in claim 1, wherein the block unit includes a first block, a second block and a middle block which is located between the first block and the second block, the bottom board has two protrusion, the top board has two grooves, two rooms are defined between the top board, the bottom board, the first block, the second block and the middle block, the middle block is located between the two rooms, the first and second blocks each have a lateral protrusion extending toward the middle block and located in the room corresponding thereto, the middle block has two lateral portion respectively extending from two sides thereof, the two lateral portions located in the two rooms respectively, each room includes a top slot, a bottom slot and a neck room which is in communication with the top and bottom slots, a lip extends from one of the first and second blocks and located in the top slot corresponding thereto, a semi-circular groove is defined in the other one of the first and second blocks and located in the top slot corresponding thereto, the middle block has a lip and a semi-circular groove respectively defined in two sides thereof, the lips and the semi-circular grooves are adapted to position the silicon steel bars in the two rooms.

6. The silicon steel bars checking device as claimed in claim 5, wherein each of the at least one groove of the top board includes a ridge, the ridge, the lip and the semi-circular groove position the silicon steel bars in each of the rooms at three positions.

* * * * *